United States Patent
Nies

(10) Patent No.: US 11,073,137 B2
(45) Date of Patent: Jul. 27, 2021

(54) JOURNAL BEARING HOUSING AND SHAFT FOR A WIND TURBINE DRIVETRAIN HAVING CORRESPONDING DEFORMATION

(71) Applicant: General Electric Company, Schenectady, NY (US)

(72) Inventor: Jacob Johannes Nies, Hertme (NL)

(73) Assignee: General Electric Company, Schenectady, NY (US)

( * ) Notice: Subject to any disclaimer, the term of this patent is extended or adjusted under 35 U.S.C. 154(b) by 103 days.

(21) Appl. No.: 16/460,493

(22) Filed: Jul. 2, 2019

(65) Prior Publication Data
US 2021/0003117 A1  Jan. 7, 2021

(51) Int. Cl.
| | |
|---|---|
| F03D 80/70 | (2016.01) |
| F03D 1/00 | (2006.01) |
| F16C 17/10 | (2006.01) |
| F16C 27/02 | (2006.01) |

(52) U.S. Cl.
CPC ............... *F03D 80/70* (2016.05); *F03D 1/00* (2013.01); *F16C 17/10* (2013.01); *F16C 27/02* (2013.01); *F05B 2240/54* (2013.01); *F16C 2360/31* (2013.01)

(58) Field of Classification Search
CPC .......... F03D 80/70; F16C 17/02; F16C 17/03; F16C 27/02; F16C 27/06; F05D 2240/54
See application file for complete search history.

(56) References Cited

U.S. PATENT DOCUMENTS

| | | | | |
|---|---|---|---|---|
| 5,501,531 A | * | 3/1996 | Hamaekers | B60K 17/24 384/536 |
| 8,573,850 B2 | * | 11/2013 | Reihle | F16F 1/3828 384/536 |
| 9,458,880 B2 | | 10/2016 | Kari et al. | |
| 9,869,301 B2 | * | 1/2018 | Markussen | F03D 80/80 |
| 9,939,011 B2 | * | 4/2018 | Tessier | H02K 5/163 |

(Continued)

FOREIGN PATENT DOCUMENTS

| | | |
|---|---|---|
| DE | 102008014666 A1 | 9/2009 |
| EP | 2101071 B1 | 9/2009 |

(Continued)

OTHER PUBLICATIONS

European Search Report, dated Dec. 9, 2020, for EP Application No. 20183761.4.

*Primary Examiner* — Ninh H. Nguyen
(74) *Attorney, Agent, or Firm* — Dority & Manning, P.A.

(57) ABSTRACT

A bearing assembly for a drivetrain of a wind turbine includes at least one shaft having a circumferential outer surface. The bearing assembly also includes a bearing housing arranged circumferentially around the circumferential outer surface of the shaft. The bearing housing having at least deformation such that the bearing housing and the shaft have a corresponding deformation around a toroidal axis such that interfacing surfaces of the bearing housing and the shaft flex together and remain parallel during operation of the drivetrain, thereby distributing operational loads of the drivetrain. The bearing assembly further includes a bearing housed at least partially within the bearing housing and engaging the circumferential outer surface of the shaft.

18 Claims, 8 Drawing Sheets

(56) References Cited

U.S. PATENT DOCUMENTS 9,995,283 B2 6/2018 Stiesdal
2013/0071246 A1 3/2013 Kari et al.

FOREIGN PATENT DOCUMENTS

| EP | 2843229 A1 | 3/2015 |
|----|-----------|--------|
| GB | 1142634 A | 2/1969 |
| GB | 2509242 A | 6/2014 |
| WO | WO 2012119603 A2 | 9/2012 |
| WO | WO 2019020213 A1 | 1/2019 |

* cited by examiner

JOURNAL BEARING HOUSING AND SHAFT FOR A WIND TURBINE DRIVETRAIN HAVING CORRESPONDING DEFORMATION

FIELD

The present disclosure relates in general to wind turbines, and more particularly to journal bearing housings and the respective shafts for a wind turbine drivetrain having a corresponding deformation.

BACKGROUND

Generally, a wind turbine includes a tower, a nacelle mounted on the tower, and a rotor coupled to the nacelle. The rotor generally includes a rotatable hub and a plurality of rotor blades coupled to and extending outwardly from the hub. Each rotor blade may be spaced about the hub so as to facilitate rotating the rotor to enable kinetic energy to be converted into usable mechanical energy, which may then be transmitted to an electric generator disposed within the nacelle for the production of electrical energy. Typically, a gearbox is used to drive the electric generator in response to rotation of the rotor. For instance, the gearbox may be configured to convert a low speed, high torque input provided by the rotor to a high speed, low torque output that may drive the electric generator.

The drivetrain generally includes a plurality of bearings arranged with the rotor shaft (also referred to herein as the low-speed shaft), the pin shafts, and/or the high-speed shaft of the generator. Moreover, lubrication is generally provided between the various bearing(s) and the rotating components. Such bearings may include, for example, journal bearings that require compliance to counter the deformation which occurs due to the deformation of the parts surrounding the bearings.

For conventional journal bearings, extra components are added thereto so as to increase the flexibility thereof. For example, conventional journal bearings include gliding pads, pivot joints, steel springs, and/or flexible geometry designs to compensate for misalignment, dynamic movements, and/or deflection of the rotating shafts versus the deflecting housing structure of the bearing. Without this flexibility, high edge loading and seizure of the bearings can occur. Such components, however, add to the complexity of the bearing design.

Accordingly, a drivetrain for a wind turbine having one or more journal bearings that address the aforementioned issues would be welcomed in the art.

BRIEF DESCRIPTION

Aspects and advantages of the invention will be set forth in part in the following description, or may be obvious from the description, or may be learned through practice of the invention.

In one aspect, the present disclosure is directed to a bearing assembly for a drivetrain of a wind turbine. The bearing assembly includes a shaft having a circumferential outer surface. The bearing assembly also includes a bearing housing arranged circumferentially around the circumferential outer surface of the shaft. The bearing housing has at least deformation such that the bearing housing and the shaft have a corresponding deformation around a toroidal axis such that interfacing surfaces of the bearing housing and the shaft flex together and remain parallel during operation of the drivetrain, thereby distributing operational loads of the drivetrain. The bearing assembly further includes a bearing housed at least partially within the bearing housing and engaging the circumferential outer surface of the shaft.

In an embodiment, the deformation(s) may be caused by at least one flexible hinge. In such embodiments, the flexible hinge allows the bearing housing to tilt as a whole or locally. Further, the bearing housing may have a base portion and a bearing contacting portion adjacent to the bearing. In another embodiment, the bearing housing may include symmetrical opposing flexible hinges.

In several embodiments, the bearing assembly may include a cavity on the circumferential outer surface of the shaft that receives and secures the bearing in place, the cavity defining a base wall and opposing side walls. In one embodiment, one or more of the opposing side walls of the cavity may integral with the shaft. In alternative embodiments, at least one of the opposing side walls may be formed via a removable ring secured to the circumferential outer surface of the shaft.

In further embodiments, a lengthwise cross-section of the bearing may be curved prior to being secured into the cavity so as to provide a desired preload over a length of the bearing.

In another embodiment, the bearing assembly may include one or more bearing pads within the cavity on one or more sides of the bearing.

In an embodiment, the opposing side walls may include, for example, a rotor-side wall and a generator-side wall. In such embodiments, if an angular misalignment of the shaft occurs during operation of the drivetrain, the flexible hinge is configured to tilt to define an axial gap between an upper rotor-side portion of the bearing and an upper portion of the rotor-side wall such that only lower bearing pads and a lower portion of the rotor-side wall carry a load.

In additional embodiments, the shaft may also include at least one flexible hinge adjacent to the bearing. In particular embodiments, the bearing housing and/or the shaft may be constructed, at least in part, of a compliant material.

In further embodiments, the bearing may be a journal bearing, a thrust bearing, an axial bearing, and/or a radial bearing. In an embodiment, for example, the shaft may be a low-speed shaft of the drivetrain.

In another embodiment, where the bearing is the journal bearing and the shaft is the low-speed shaft coupling a rotor to a gearbox of the wind turbine, the bearing assembly may also include one or more flexible components mounted in an offset location around the gearbox so as to offset a weight-load and thrust of the rotor such that a nominal load is taken at a neutral misalignment position.

In still further embodiments, due to the corresponding deformation described herein, the bearing assembly may be absent of bearing pads.

In another aspect, the present disclosure is directed to a drivetrain assembly. The drivetrain assembly includes a rotor, a low-speed shaft rotatably coupled to the rotor. The low-speed shaft includes at least a circumferential outer surface. The drivetrain assembly also includes a gearbox rotatably coupled to the low-speed shaft and a bearing assembly. The bearing assembly includes a bearing housing arranged circumferentially around the circumferential outer surface of the low-speed shaft. The bearing housing has at least deformation such that the bearing housing and the low-speed shaft have a corresponding deformation around a toroidal axis such that interfacing surfaces of the bearing housing and the low-speed shaft flex together and remain parallel during operation of the drivetrain assembly, thereby distributing operational loads of the drivetrain assembly. The bearing assembly also includes a journal bearing housed at least partially within the bearing housing and engaging the circumferential outer surface of the low-speed shaft. It should also be understood that the drivetrain assembly may further include any of the additional features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
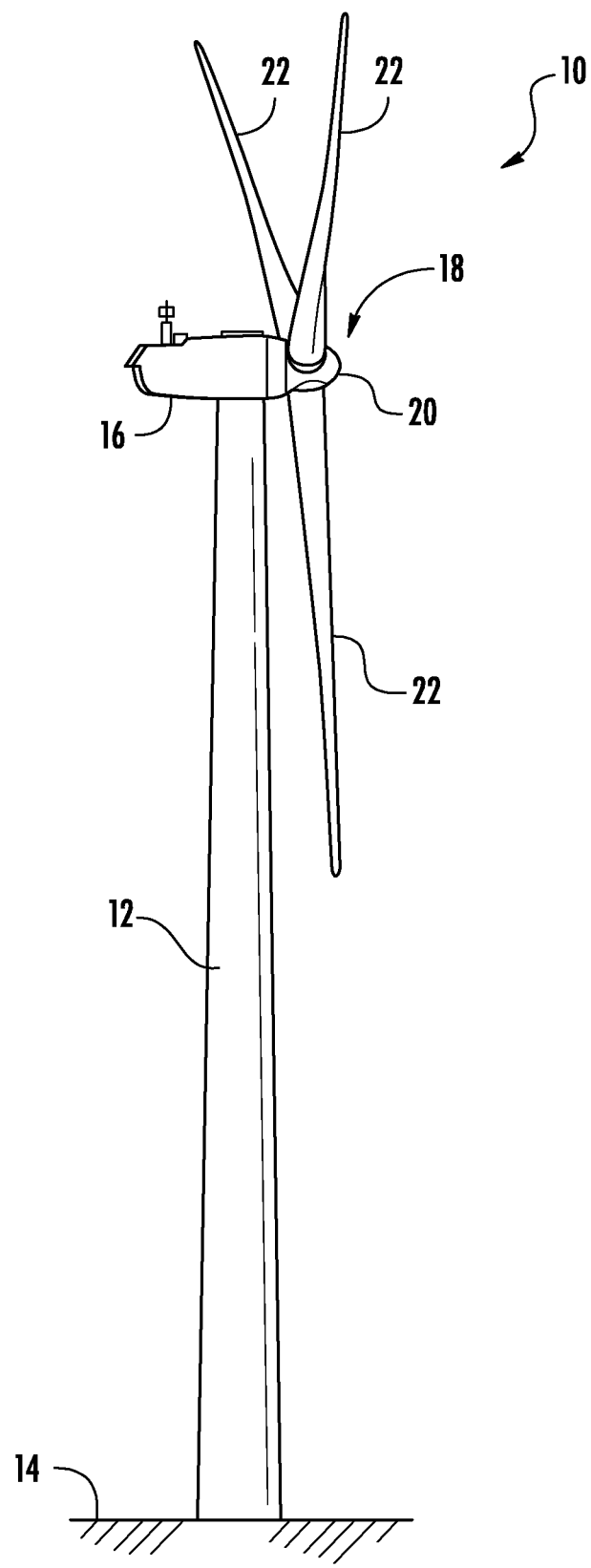
FIG. 1 illustrates a perspective view of one embodiment of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a drivetrain assembly that includes a shaft and one or more journal bearings and associated housing mounted thereon, with the shaft and the housing having substantial flexibility. Thus, the shaft and bearing housing are flexible around a toroidal axis, allowing both running surfaces to flex in full coordination. By providing the matching flexibility, the running surfaces remain substantially parallel to each during operation of the drivetrain, thereby allowing full contact between the bearing and the shaft so as to build hydrodynamic pressure or in the case of mixed friction, to share the load to minimize peak loads.

Referring now to the drawings, FIG. 1 illustrates a perspective view of one embodiment of a wind turbine 10 according to the present disclosure. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

Figure 2:
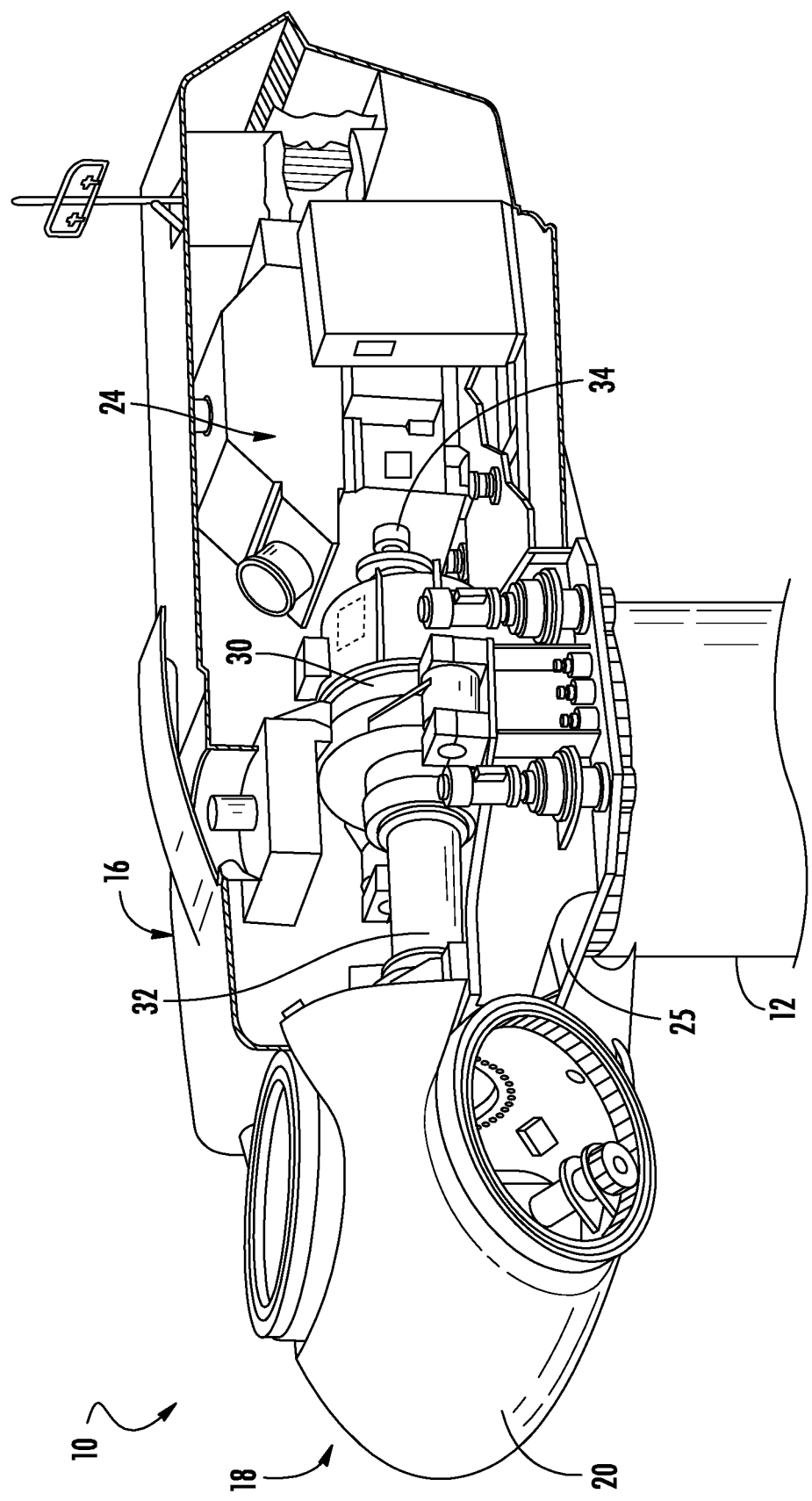
FIG. 2 illustrates a detailed, internal view of one embodiment of a nacelle of a wind turbine according to the present disclosure.

Referring now to FIG. 2, a simplified, internal view of a nacelle 16 of the wind turbine 10 according to conventional construction is illustrated. As shown, the generator 24 may be disposed within the nacelle 16. In general, the generator 24 may be coupled to the rotor 18 of the wind turbine 10 for producing electrical power from the rotational energy generated by the rotor 18. For example, as shown in the illustrated embodiment, the rotor 18 may include a rotor shaft 28 coupled to the hub 20 for rotation therewith. The rotor shaft 28 may, in turn, be rotatably coupled to a drivetrain assembly that includes the generator 24 and a gearbox 26. More specifically, the rotor shaft 28 may, in turn, be rotatably coupled to a generator shaft 34 of the generator 24 through the gearbox 26.

As is generally understood, the rotor shaft 28 may provide a low speed, high torque input to the gearbox 26 in response to rotation of the rotor blades 22 and the hub 20. Thus, the gearbox 26 may include a gear assembly (not shown) that converts the low speed, high torque input to a high speed, low torque output to drive the generator shaft 34 and, thus, the generator 24. In alternative embodiments, the rotor shaft 28 may be eliminated and the rotatable hub 20 may be configured to turn the gears of the gearbox 26, rather than requiring a separate rotor shaft 28.

Figure 3:
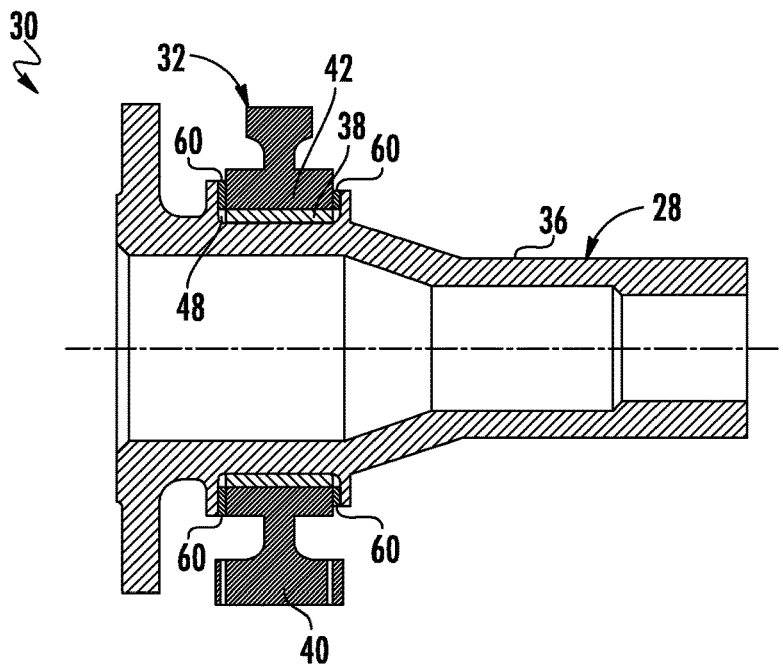
FIG. 3 illustrates a side view of one embodiment of a rotor shaft of a wind turbine according to the present disclosure, particularly illustrating a bearing assembly engaged with the rotor shaft.
Figure 4:
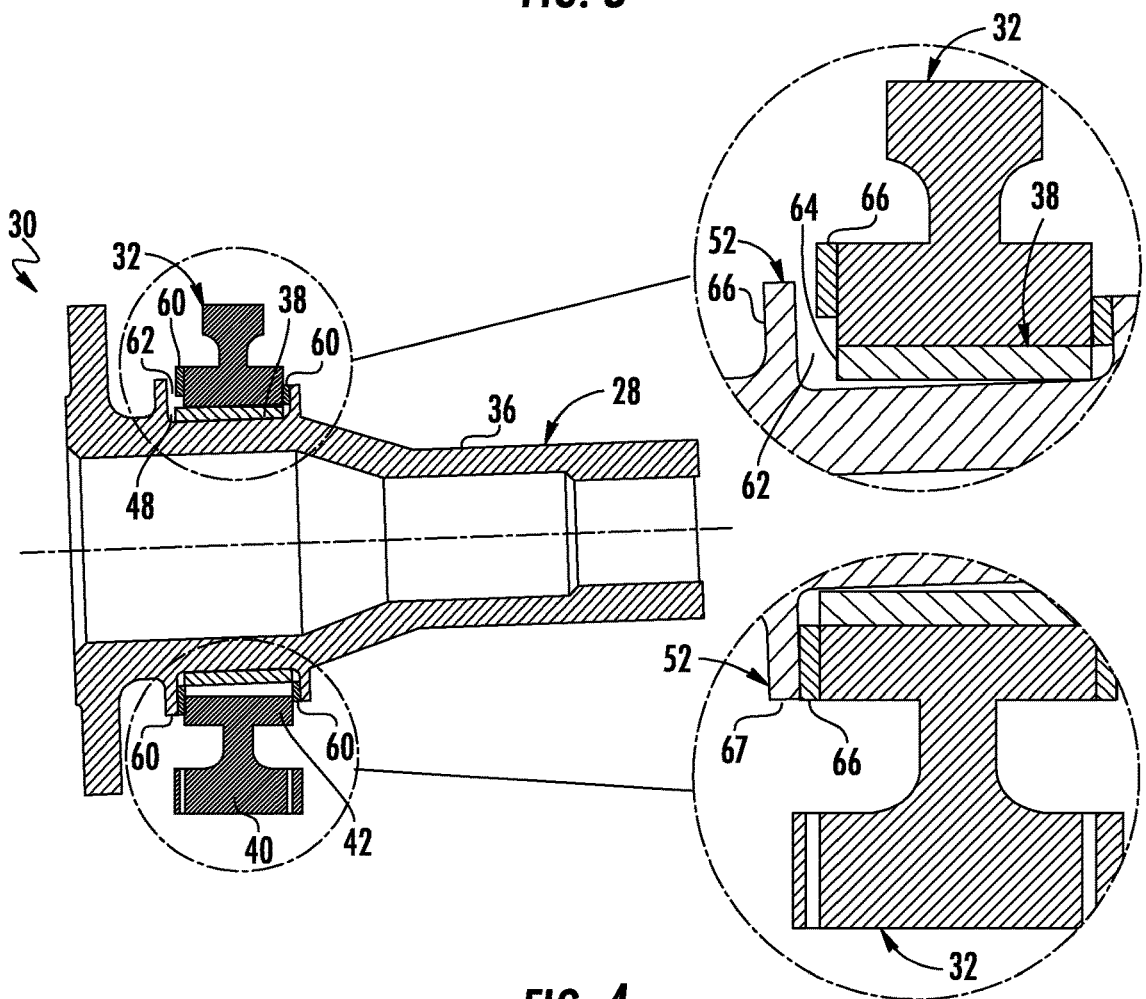
FIG. 4 illustrates a side view of the rotor shaft of FIG. 3 during operation to depict an angular misalignment of the shaft according to the present disclosure, wherein an axial gap is defined between an upper rotor-side portion of the bearing and an upper portion of the rotor-side wall such that only lower bearing pads and the rotor-side wall carry the load.

Referring now to FIGS. 3 and 4, side views of one embodiment of a bearing assembly 30 according to the present disclosure are illustrated. More specifically, as shown, the bearing assembly 30 includes the rotor shaft 28 having an outer circumferential surface 36. The bearing assembly 30 also includes a bearing housing 32 arranged circumferentially around the circumferential outer surface 36 of the shaft 28. The bearing assembly 30 further includes a bearing 38, such as a journal bearing, housed at least partially within the bearing housing 32 and engaging the circumferential outer surface 36 of the shaft 28. As will be described in more detail herein, the bearing housing 32 and the shaft 28 have a corresponding deformation around a toroidal axis such that interfacing surfaces of the bearing housing 32 and the shaft 28 flex together and remain parallel during operation of the drivetrain, thereby distributing operational loads thereof.

Referring to FIGS. 3-5, 7A, and 7B, the bearing assembly 30 may include a cavity 48 on the circumferential outer surface 36 of the shaft 28 that receives and secures the bearing 38 in place. For example, as shown particularly in FIGS. 7A and 7B, the cavity 48 may define a base wall 50 and opposing side walls 52, 54. More specifically, as shown, the opposing side walls 52, 54 may include, for example, a rotor-side wall 52 and a generator-side wall 54.

Figure 5:
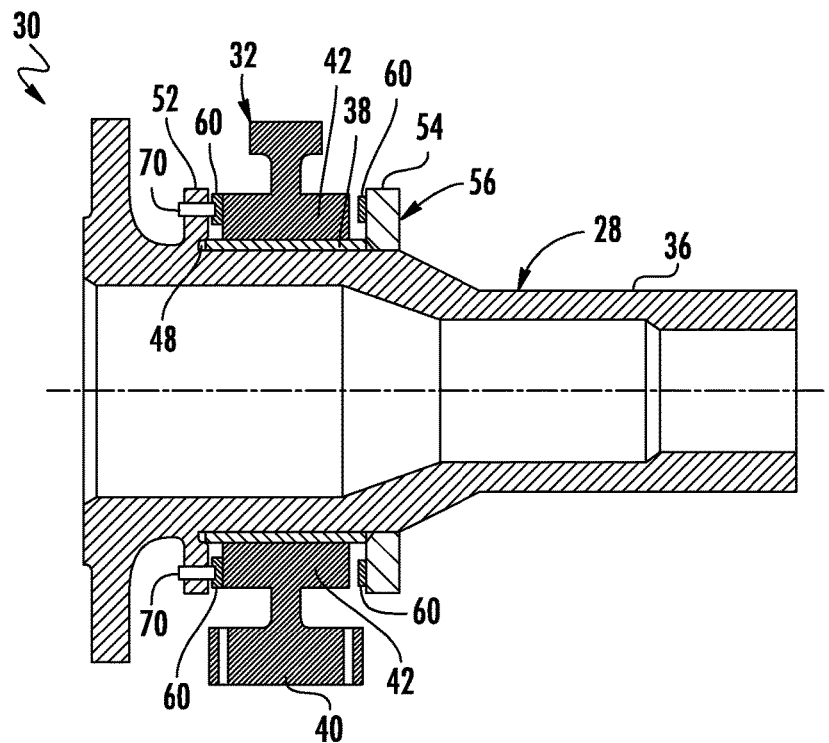
FIG. 5 illustrates a side view of another embodiment of a rotor shaft of a wind turbine according to the present disclosure, particularly illustrating a bearing assembly engaged with the rotor shaft.
Figure 7A:
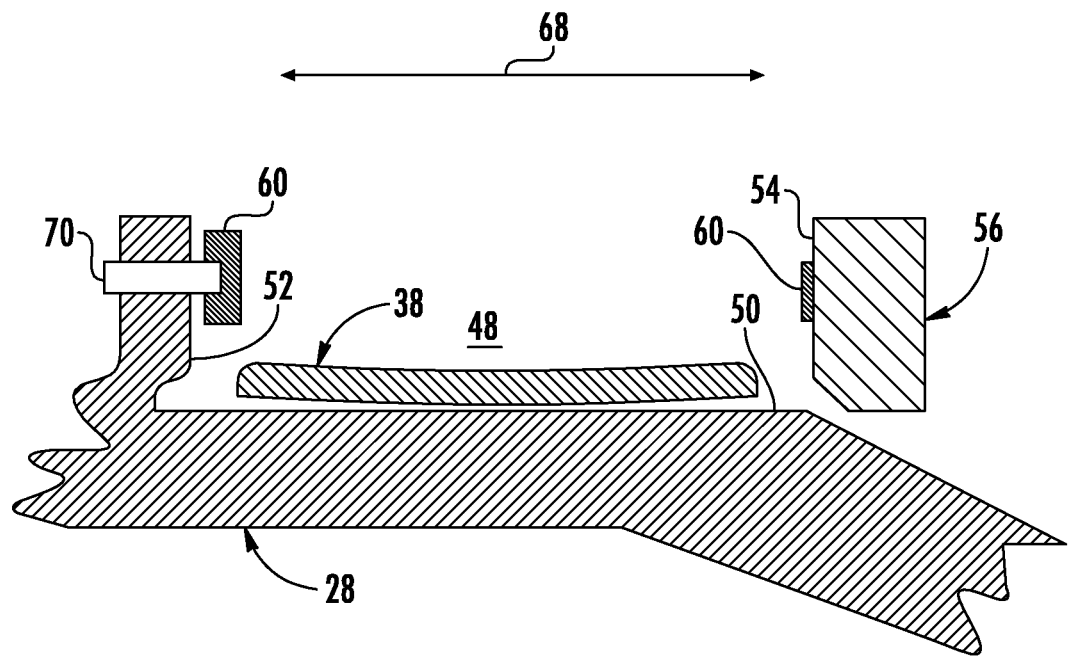
FIG. 7A illustrates a partial, cross-sectional view of one embodiment of a cavity receiving a bearing or a part with a running surface according to the present disclosure, particularly illustrating the bearing having a curved lengthwise cross-section prior to being secured into a cavity on a circumferential outer surface of the shaft.
Figure 7B:
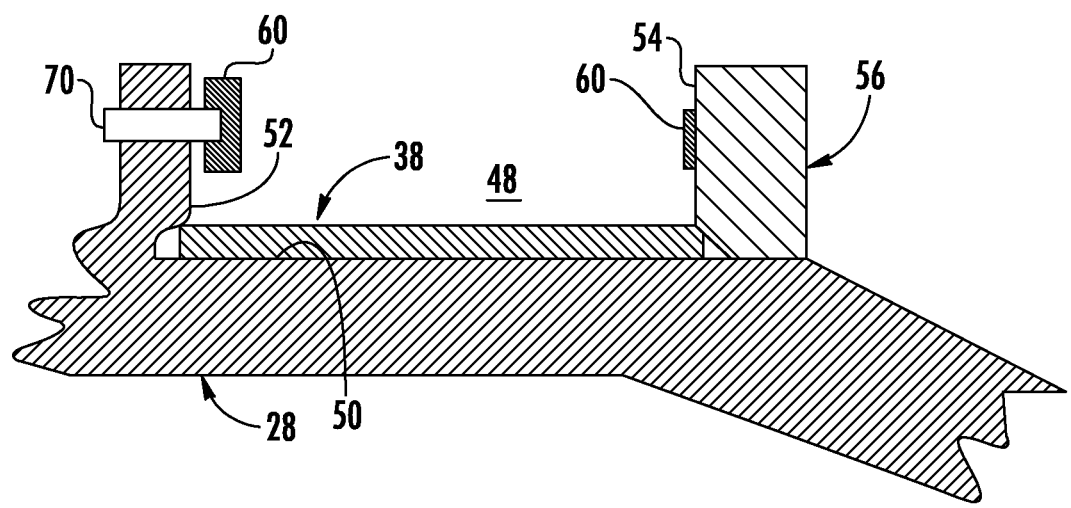
FIG. 7B illustrates a cross-sectional view of the curved bearing of FIG. 7A according to the present disclosure, particularly illustrating the bearing secured within the cavity of the shaft so as to provide a desired preload over a length of the bearing during operation of the drivetrain.

In several embodiments, as shown particularly in FIGS. 3 and 4, one or more of the opposing side walls 52, 54 of the cavity 48 may integral with the shaft 28. In alternative embodiments, as shown in FIGS. 5, 7A, and 7B, at least one of the opposing side walls 52, 54 may be formed via a removable ring 56 secured to the circumferential outer surface 36 of the shaft 28. In such embodiments, the removable ring 56 can assist with easy installation of the bearing 38. For example, the bearing 38 can be placed around the shaft 28 within the cavity 48 and the removable ring 56 may be subsequently secured around the shaft to secure the bearing 38 in place. In particular embodiments, as shown in FIGS. 7A and 7B, a lengthwise cross-section of the bearing 38 (e.g. along a lengthwise axis 68) may be curved prior to being secured into the cavity 48 (see e.g. FIG. 7A) so as to provide a desired preload over a length of the bearing 38 after installation (See e.g. FIG. 7B).

Referring to FIGS. 3-5, 7A, and 7B, in another embodiment, the bearing assembly 30 may also include one or more bearing pads 60 (axial or radial) within the cavity 48 on one or more sides of the bearing 38 and/or the bearing housing 32. For example, in the illustrated embodiment, the bearing assembly 30 includes a bearing pad 60 within the cavity 48 on each side of the bearing 38/bearing housing 32. It should be understood that the bearing pads 60 may be secured in place using any suitable means, such as for example, adhesive (FIGS. 3 and 4), form closed features such as tilting-pad hinges and/or fasteners 70 (FIG. 5).

Figure 6A:
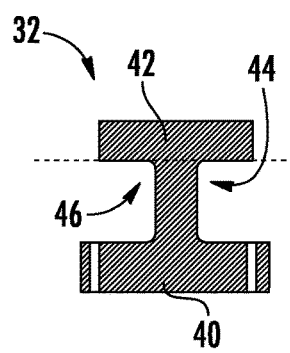
FIG. 6A illustrates a cross-sectional view of one embodiment of a bearing housing of a bearing assembly according to the present disclosure, particularly illustrating a bearing housing having a flexible hinge.
Figure 6B:
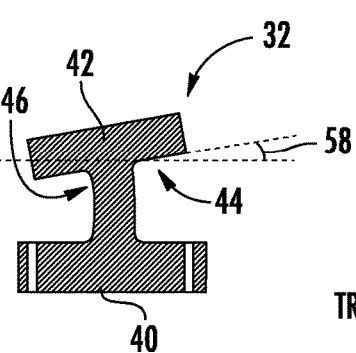
FIG. 6B illustrates a cross-sectional view of the bearing housing of FIG. 6A, particularly illustrating the flexible hinge being tilted.
Figure 6C:
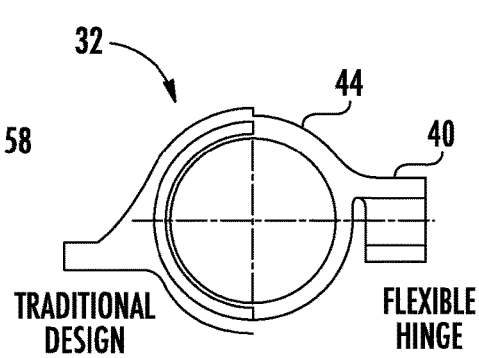
FIG. 6C illustrates a front view of another embodiment of a bearing housing of a bearing assembly according to the present disclosure, particularly illustrating a bearing housing having a flexible hinge.

Referring particularly to FIGS. 3-6C, the bearing housing 32 described herein may have a base portion 40, a bearing contacting portion 42 adjacent to the bearing 38 and at least one deformation formed therein. For example, as shown, the deformation may include at least one flexible hinge 44, 46 (FIGS. 6A-6C). Accordingly, the base portion 40 may be secured to, for example, a bedplate 25 (FIG. 2) of the wind turbine 10. In such embodiments, as shown particularly in FIGS. 6A-6C, the flexible hinge(s) 44, 46 provides flexibility to the bearing housing 32, for example, by allowing the bearing housing 32 to tilt, e.g. by a certain angle 58. Thus, the flexible hinge(s) 44, 46 allow the flexibility of the bearing housing 32 and the shaft 28 to be substantially the same around a toroidal axis, allowing both running surfaces thereof to flex in full coordination. By providing the matching flexibility, the running surfaces remain substantially parallel to each during operation of the drivetrain, thereby allowing full contact between the bearing 38 and the shaft 28 so as to build hydrodynamic pressure or in the case of mixed friction, to share the load to minimize peak loads. The bearing 38 could also have a soft running surface to accommodate uneven counter surfaces and/or particles in the oil.

In such embodiments, if an angular misalignment of the shaft 28 occurs during operation of the drivetrain (See e.g. FIG. 4), the flexible hinge(s) 44, 46 is configured to tilt to define an axial gap 62 between an upper rotor-side portion 64 of the bearing 38 and an upper portion 66 of the rotor-side wall 52 such that only lower bearing pads 60 and a lower portion 67 of the rotor-side wall 52 carry a load.

Figure 8A:
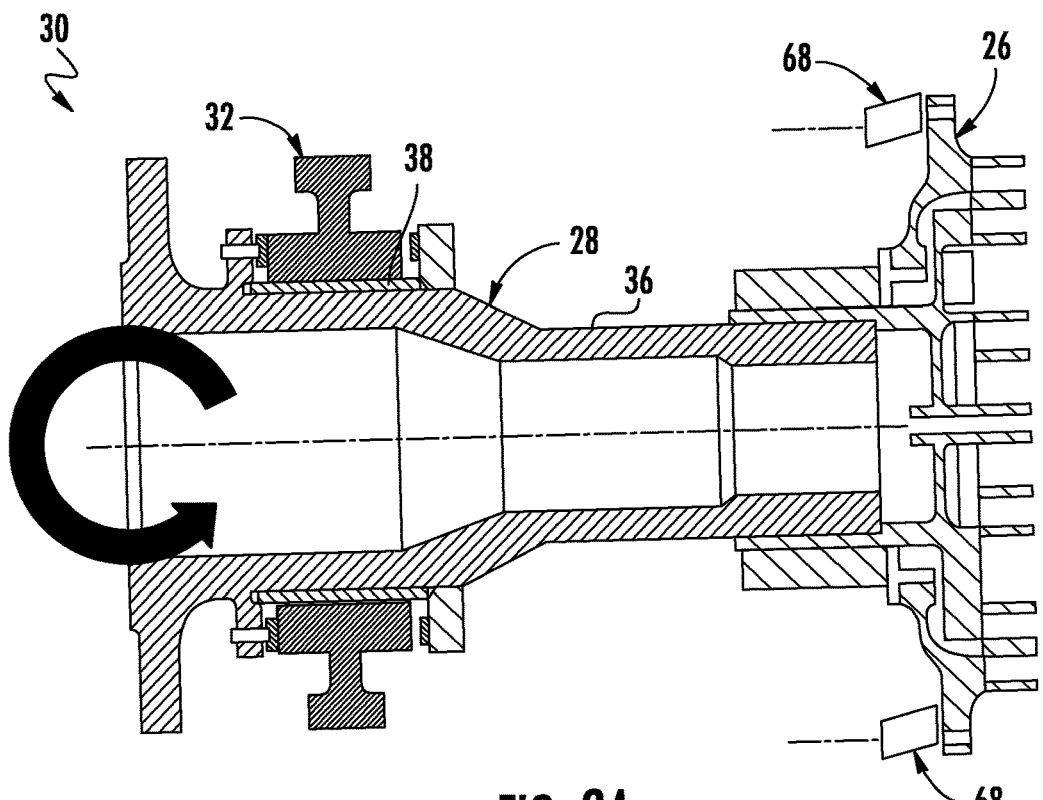
FIG. 8A illustrates a side view of one embodiment of a rotor shaft of a wind turbine according to the present disclosure, particularly illustrating a bearing assembly engaged with the rotor shaft and flexible components mounted in an aligned location around the gearbox.
Figure 8B:
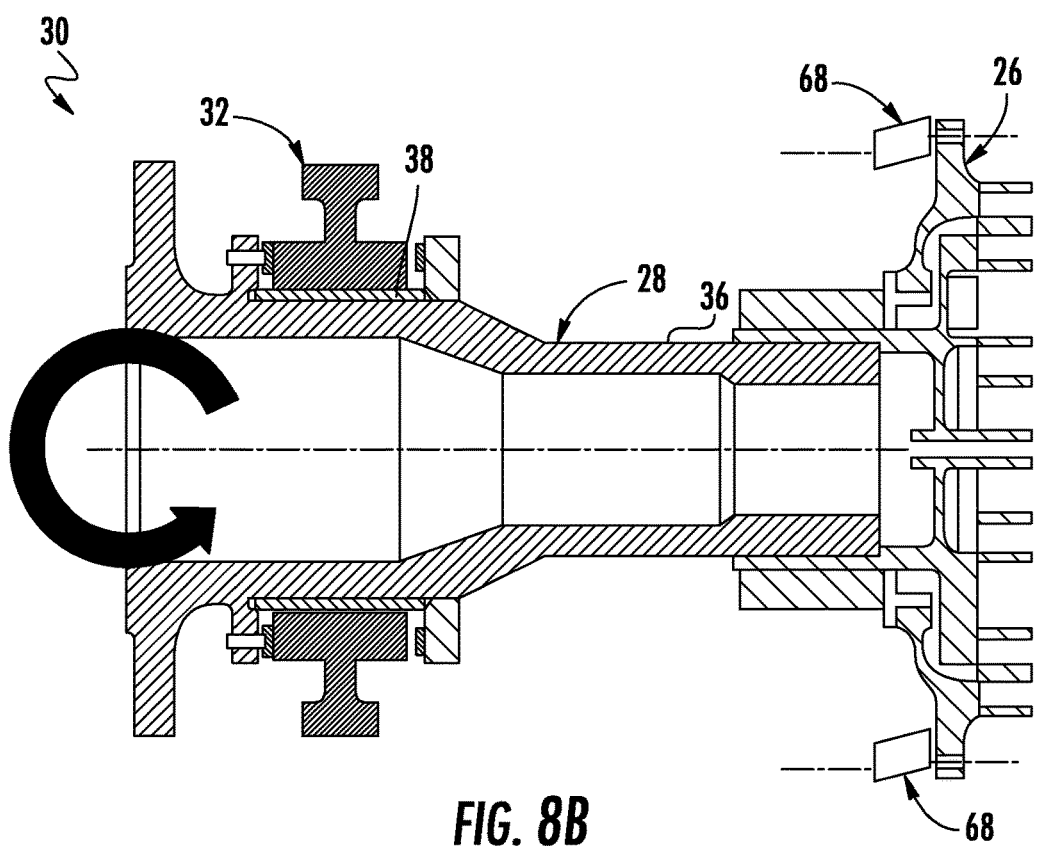
FIG. 8B illustrates a side view of one embodiment of a rotor shaft of a wind turbine according to the present disclosure, particularly illustrating a bearing assembly engaged with the rotor shaft and flexible components mounted in an offset location around the gearbox so as to offset a weight-load and thrust of the rotor such that a nominal load is taken at a neutral misalignment position.
Figure 9:
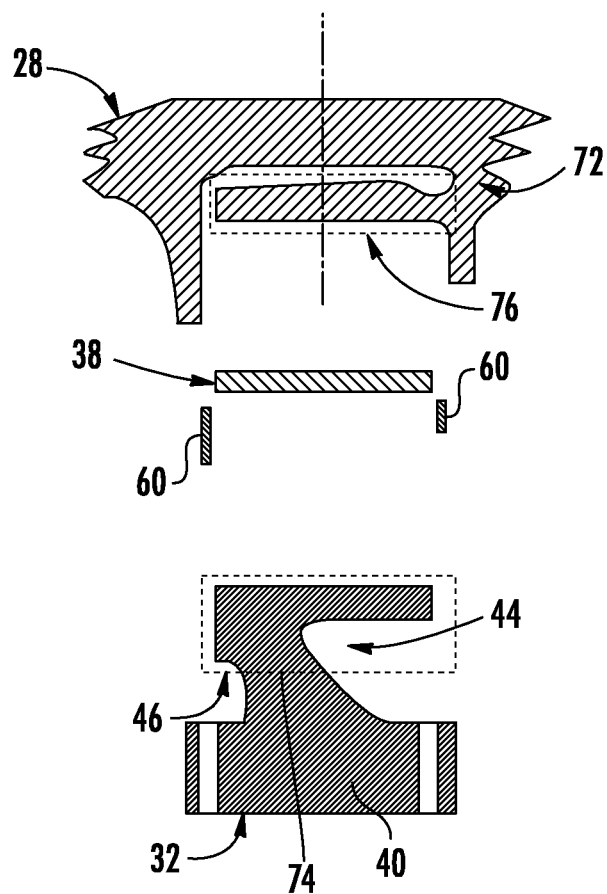
FIG. 9 illustrates a partial, cross-sectional, exploded view of one embodiment the bearing assembly according to the present disclosure, particularly illustrating a bearing housing and a rotor shaft thereof having a flexible hinge.

Referring now to FIGS. 8A and 8B, the bearing assembly 30 may also include one or more flexible components 68 mounted around the gearbox 26. More specifically, FIG. 8A illustrates a side view of one embodiment of the rotor shaft 28 of the wind turbine 10 according to the present disclosure, particularly illustrating the bearing assembly 30 engaged with the rotor shaft 28 and the flexible components 68 mounted in an aligned location around the gearbox 26. Alternatively, as shown in FIG. 8B, a side view of one embodiment of the rotor shaft 28 according to the present disclosure is illustrated, particularly illustrating the bearing assembly 30 engaged with the rotor shaft 28 and the flexible components 68 mounted in an offset location around the gearbox 26 so as to offset a weight-load and thrust of the rotor such that a nominal load is taken at a neutral misalignment position.

Figure 10A:
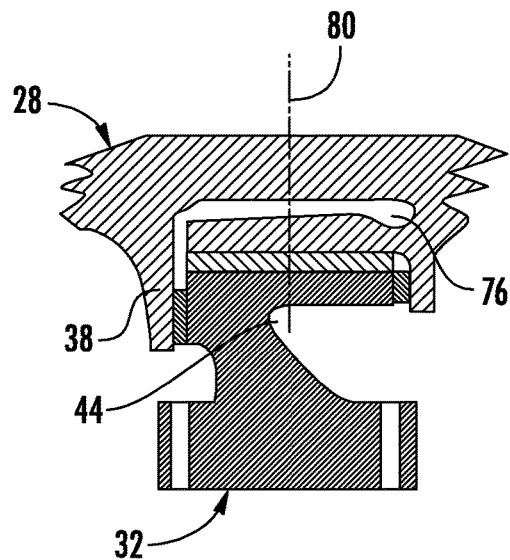
FIG. 10A illustrates a partial, cross-sectional view of one embodiment the bearing assembly according to the present disclosure.
Figure 10B:
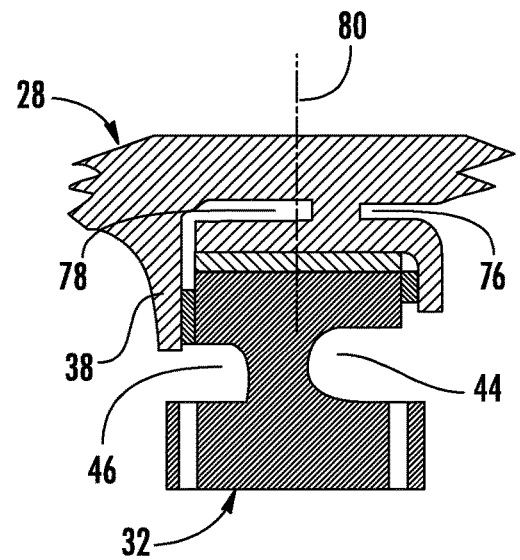
FIG. 10B illustrates a partial, cross-sectional view of another embodiment the bearing assembly according to the present disclosure.
Figure 10C:
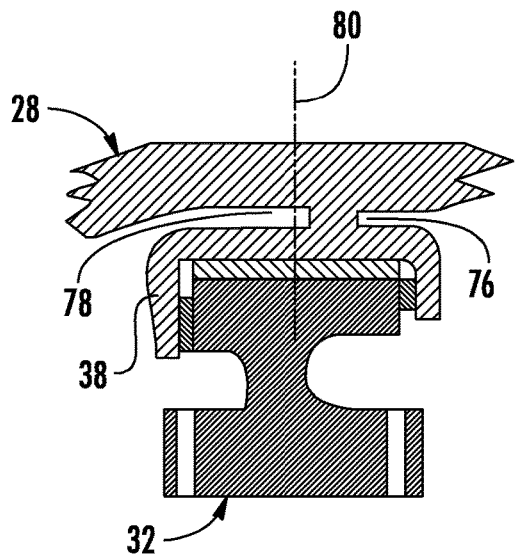
FIG. 10C illustrates a partial, cross-sectional view of yet another embodiment the bearing assembly according to the present disclosure.

Referring now to FIGS. 9 and 10A-10C, the rotor shaft 28 may also include at least one flexible hinge 76 adjacent to the bearing 38. For example, as shown, the flexible hinge 76 may provide toroidal flexibility to the shaft 28 (similar to the flexible hinges 44, 46 of the bearing housing 32. Further, as shown, the center of toroidal rotation of the shaft 28 and the bearing housing 32 are illustrated at points 72 and 74, respectively. FIGS. 10A-10C provide further example embodiments of shaft/bearing housing configurations according to the present disclosure. More specifically, as shown, FIG. 10A illustrates the shaft 28 having a single flexible hinge 76. In such an embodiment, the flexible hinges 44, 76 may be positioned on opposing sides of the center 80 of the bearing assembly. In another embodiment, as shown in FIGS. 10B and 10C, the shaft 28 has opposing flexible hinge 76, 78.

In additional embodiments, the bearing housing 32 and/or the shaft 28 may be constructed, at least in part, of a compliant material so as to provide a desired flexibility thereto.

In still further embodiments, due to the corresponding deformation described herein, the bearing assembly 30 may be absent of bearing pads such that the design is simplified over conventional bearing designs.

It should be understood that the bearing(s) of the drivetrain assembly described herein may correspond to any type of bearing, including but not limited to journal bearings, thrust bearings, axial bearings, and/or radial bearings. Accordingly, in certain embodiments, the bearing(s) may be placed (e.g. by sliding, securing, mounting, or printing) or otherwise added onto the various shafts described herein. In another embodiment, the bearing(s) may be constructed of a metal or metal alloy, including, for example, a copper alloy (e.g. bronze) and/or polyetheretherketone (PEEK). Thus, the bearing(s) may provide improved wear characteristics under loading (especially at startup and shutdown, when an oil film may be insufficient to separate the rotating and non-rotating surfaces).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A bearing assembly for a drivetrain of a wind turbine, the bearing assembly comprising:
    a shaft comprising a circumferential outer surface;
    a bearing housing arranged circumferentially around the circumferential outer surface of the shaft, the bearing housing comprising at least one deformation such that the bearing housing and the shaft have a corresponding deformation around a toroidal axis such that interfacing surfaces of the bearing housing and the shaft flex together and remain parallel during operation of the drivetrain, thereby distributing operational loads of the drivetrain; and,
    a bearing housed at least partially within the bearing housing, the bearing engaging the circumferential outer surface of the shaft,
    wherein the bearing housing and the shaft are constructed, at least in part, of a compliant material.

2. The bearing assembly of claim 1, wherein the at least deformation is caused by a flexible hinge, the bearing housing further comprising a base portion and a bearing contacting portion adjacent to the bearing, the at least one flexible hinge allowing the bearing housing to tilt.

3. The bearing assembly of claim 2, wherein the bearing housing comprises symmetrical opposing flexible hinges.

4. The bearing assembly of claim 2, further comprising a cavity on the circumferential outer surface of the shaft that receives and secures the bearing in place, the cavity defining a base wall and opposing side walls.

5. The bearing assembly of claim 4, wherein at least one of the opposing side walls is formed via a removable ring secured to the circumferential outer surface of the shaft.

6. The bearing assembly of claim 4, wherein a lengthwise cross-section of the bearing is curved prior to being secured into the cavity so as to provide a desired preload over a length of the bearing.

7. The bearing assembly of claim 4, further comprising one or more bearing pads within the cavity on one or more sides of the bearing.

8. The bearing assembly of claim 4, wherein the opposing side walls comprise a rotor-side wall and a generator-side wall, wherein, if an angular misalignment of the shaft occurs during operation of the drivetrain, the flexible hinge is configured to tilt to define an axial gap between an upper rotor-side portion of the bearing and an upper portion of the rotor-side wall such that only lower bearing pads and a lower portion of the rotor-side wall carry a load.

9. The bearing assembly of claim 1, wherein the shaft comprises at least one flexible hinge adjacent to the bearing.

10. The bearing assembly of claim 1, wherein the bearing comprises at least one of a journal bearing, a thrust bearing, an axial bearing, or a radial bearing, and the shaft comprises a low-speed shaft of the drivetrain.

11. The bearing assembly of claim 10, wherein the bearing comprises the journal bearing, the shaft comprising the low-speed shaft coupling a rotor of the wind turbine to a gearbox of the wind turbine, the bearing assembly further comprising one or more flexible components mounted in an offset location around the gearbox so as to offset a weight-load and thrust of the rotor such that a nominal load is taken at a neutral misalignment position.

12. The bearing assembly of claim 1, wherein the bearing assembly is absent of bearing pads.

13. A drivetrain assembly, comprising:
    a rotor;
    a low-speed shaft rotatably coupled to the rotor, the low-speed shaft comprising a circumferential outer surface;
    a gearbox rotatably coupled to the low-speed shaft; and,
    a bearing assembly comprising:
        a bearing housing arranged circumferentially around the circumferential outer surface of the low-speed shaft, the bearing housing comprising at least one deformation such that the bearing housing and the low-speed shaft have a corresponding deformation around a toroidal axis such that interfacing surfaces of the bearing housing and the low-speed shaft flex together and remain parallel during operation of the drivetrain assembly, thereby distributing operational loads of the drivetrain assembly; and,
        a journal bearing housed at least partially within the bearing housing, the journal bearing engaging the circumferential outer surface of the low-speed shaft,
        wherein the at least one deformation is caused by symmetrical opposing flexible hinges, the bearing housing further comprising a base portion and a bearing contacting portion adjacent to the bearing, the at least one flexible hinge allowing the bearing housing to tilt.

14. The drivetrain assembly of claim 13, further comprising a cavity on the circumferential outer surface of the shaft that receives and secures the bearing in place, the cavity defining a base wall and opposing side walls.

15. The drivetrain assembly of claim 14, wherein at least one of the opposing side walls is formed via a removable ring secured to the circumferential outer surface of the shaft.

16. The drivetrain assembly of claim 14, wherein a lengthwise cross-section of the bearing is curved prior to being secured into the cavity so as to provide a desired preload over a length of the bearing.

17. The drivetrain assembly of claim 14, further comprising one or more bearing pads within the cavity on one or more sides of the bearing.

18. The drivetrain assembly of claim 14, wherein the opposing side walls comprise a rotor-side wall and a generator-side wall, wherein, if an angular misalignment of the shaft occurs during operation of the drivetrain, the flexible hinge is configured to tilt to define an axial gap between an upper rotor-side portion of the bearing and an upper portion of the rotor-side wall such that only lower bearing pads and a lower portion of the rotor-side wall carry a load.

\* \* \* \* \*